United States Patent [19]
Rau et al.

[11] Patent Number: 5,814,175
[45] Date of Patent: Sep. 29, 1998

[54] WELDED THERMOPLASTIC POLYMER ARTICLE AND A METHOD AND APPARATUS FOR MAKING SAME

[75] Inventors: Steven E. Rau, Oxford; Brian G. Morris, Lincoln University, both of Pa.; Robert W. Sauer, Newark, Del.

[73] Assignee: Edlon Inc., Avondale, Pa.

[21] Appl. No.: 480,799

[22] Filed: Jun. 7, 1995

[51] Int. Cl.⁶ .................................................. B29C 65/02
[52] U.S. Cl. ...................... 156/157; 156/286; 156/304.6; 156/382; 156/502
[58] Field of Search .................................. 156/157, 285, 156/286, 287, 304.1, 304.6, 382, 499, 502, 580, 581, 583.1, 583.2, 583.4, 87; 264/102

[56] References Cited

U.S. PATENT DOCUMENTS

| | | | |
|---|---|---|---|
| Re. 32,103 | 4/1986 | Struve | 156/153 |
| 2,713,017 | 7/1955 | Bruns | 154/126 |
| 2,802,086 | 8/1957 | Fener | 219/19 |
| 3,207,644 | 9/1965 | Hobson et al. | 156/217 |
| 3,660,210 | 5/1972 | Chapman | 156/583.1 |
| 3,677,845 | 7/1972 | Roberts | 156/583.1 |
| 3,707,428 | 12/1972 | Roberts | 156/583.1 |
| 3,826,702 | 7/1974 | Chapman | 156/86 |
| 3,837,965 | 9/1974 | Mahon et al. | 156/94 X |
| 3,927,233 | 12/1975 | Naidoff | 428/58 |
| 3,951,724 | 4/1976 | Johnson et al. | 156/382 |
| 4,283,448 | 8/1981 | Bowman | 428/58 |
| 4,352,707 | 10/1982 | Wengler et al. | 156/359 |
| 4,390,384 | 6/1983 | Turner | 156/221 |
| 4,541,883 | 9/1985 | Lewis | 156/159 |
| 4,560,428 | 12/1985 | Sherrick et al. | 156/94 |
| 4,622,091 | 11/1986 | Letterman | 156/286 |
| 4,681,651 | 7/1987 | Brozovic et al. | 156/382 |
| 4,701,291 | 10/1987 | Wissman | 264/248 |
| 4,725,393 | 2/1988 | Nasu | 264/160 |
| 4,732,639 | 3/1988 | Newsom | 156/382 |
| 4,876,041 | 10/1989 | Hanselka | 264/25 |
| 4,886,442 | 12/1989 | McCowin et al. | 425/388 |
| 4,927,999 | 5/1990 | Hanselka | 219/535 |
| 4,929,293 | 5/1990 | Osgar | 156/158 |
| 4,978,408 | 12/1990 | Burford et al. | 156/281 |
| 4,990,296 | 2/1991 | Pitolaj | 264/162 |
| 5,039,371 | 8/1991 | Cremens et al. | 156/382 |
| 5,116,216 | 5/1992 | Cochran et al. | 425/504 |
| 5,123,985 | 6/1992 | Evans et al. | 156/213 |
| 5,196,079 | 3/1993 | Sager | 156/73.1 |
| 5,261,993 | 11/1993 | Dahlgren | 156/382 |
| 5,322,665 | 6/1994 | Bernardon et al. | 264/571 |

*Primary Examiner*—James Sells
*Attorney, Agent, or Firm*—Synnestvedt & Lechner

[57] ABSTRACT

A method and apparatus for making a welded thermoplastic polymer article are provided. The method includes the application of a vacuum combined with sufficient heat to make the polymer flowable. The method and apparatus are especially well-suited for welding thermoplastic polymer sheets to the interior of process vessels. The resulting article has improved qualities over articles which are welded by other methods.

18 Claims, 3 Drawing Sheets

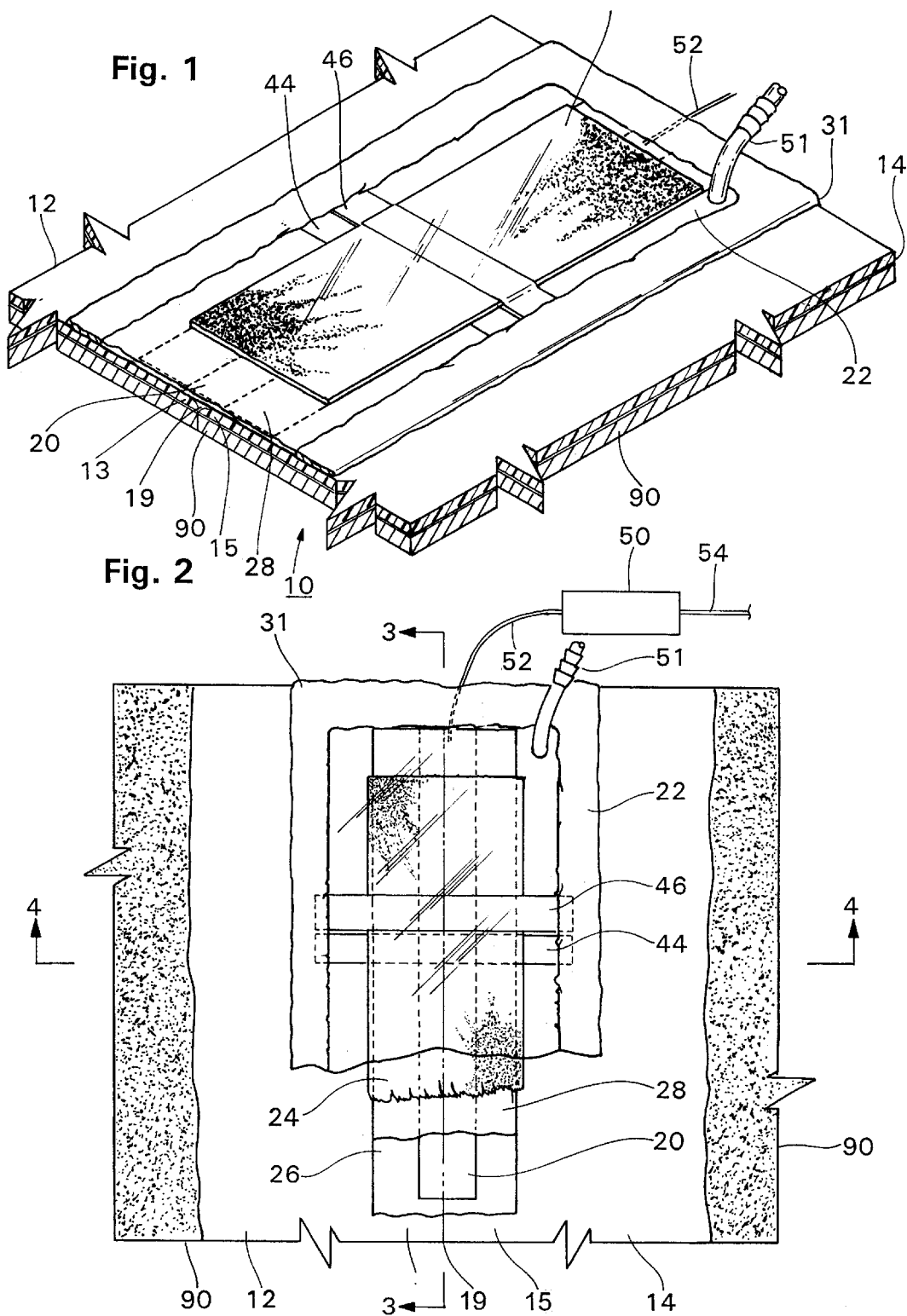

WELDED THERMOPLASTIC POLYMER ARTICLE AND A METHOD AND APPARATUS FOR MAKING SAME

FIELD OF THE INVENTION

This invention relates to joining together the edge portion of one sheet of thermoplastic material to the edge portion of another sheet of thermoplastic material. More particularly, this invention relates to improved apparatus and process for welding together two sheets of thermoplastic material and to an improved product which is capable of being formed by the process of the present development.

The present invention will be described initially in connection with joining together the edge portions of two sheets comprising a fluoropolymer material, for example, polytetrafluoroethylene (PTFE) and other fluorocarbon polymers, including homopolymers and copolymers thereof. It should be understood, however, that the present invention has applicability to welding together edge portions of sheets comprising other types of resins which are thermoplastic in nature.

Fluoropolymer materials are used widely in industry because they have a unique combination of properties, including, for example, very high heat-resistance and corrosion-resistance. They are highly inert materials which resist degradation even when exposed to materials that are considered highly corrosive and under conditions which cause deterioration of many other types of materials. For example, various types of fluoropolymer materials resist being degraded by such highly corrosive materials as sulfuric acid and nitric acid.

As a result of their properties, fluoropolymer materials, and other corrosion-resistant thermoplastic materials, in sheet form are bonded adhesively to the interior of metallic process vessels which are used in the chemical, pharmaceutical, electronic, and other industries to provide a corrosion-resistant barrier. In such applications, the polymeric sheet functions as a corrosion-resistant liner which protects the vulnerable metallic shell of the vessel from being attacked and degraded by the contents of the vessel. The polymeric sheet typically has laminated to its bonding face a knit or woven glass or synthetic fabric which functions to improve the mechanical lock of the polymeric sheet to the adhesive bonding material. Examples of such adhesive bonding materials are epoxy and elastomeric adhesives.

Due to a variety of circumstances, the use of a large number of sheets may be required to line completely a vessel. To accomplish this effectively, individual sheets must be welded together in a manner such that the weld is continuous and defect-free and not penetrable by the contents of the vessel.

The formation of such a weld is no easy task. Various properties which make fluoropolymer materials so valuable and effective for use in applications of the type described above make it extremely difficult to work with and form the material into the desired weld.

In a welding process in which thermal melting of the polymer is utilized to effect the weld, the following conditions are generally present. The two pieces to be welded together need to be in intimate contact or, if they are separated, a filler rod must be positioned between them to fill the gap. In addition, means must be provided to heat the polymer. Also, pressure needs to be applied to hold the various elements in intimate contact and to force the melted portions of the elements together.

The quality of the resulting weld is dependent entirely on the uniformity of temperature and pressure, assuming that the pieces to be joined are clean. This is readily achievable for relatively small components of uniform simple geometry, but difficult for other types of structures. The highest quality welds are known as "fusion welds". They are free of flaws such as steps or other significant changes in thickness. Such flaws can act as stress risers which reduce the ultimate strength of the weld.

When welding relatively large parts, achieving ideal conditions becomes more difficult. It becomes necessary to utilize carefully machined heating elements that are engineered to provide uniform heat and pressure. This is practical when large numbers of the same part need to be welded, but becomes uneconomical when only a few welds are required.

The present invention is related to improved means for forming improved welds which join together sheets of a fluoropolymer material and other types of plastic materials, including welds in relatively large-size pieces.

Reported Developments

Thermoplastics in general, and fluoropolymer materials in particular, have been welded over the years using a variety of techniques. Heat for melting or softening the polymeric material has been supplied by various means such as, for example, flame, infrared, electrical resistance, ultrasonics, and hot gases. Pressure for forming the weld has been provided by means such as, for example, the use of a press, by hand, and thermal expansions.

Techniques for welding together two sheets of plastic material, including fluoropolymer material, are described, for example, in U.S. patents bearing the following numbers: U.S. Pat. Nos. 3,707,428; 3,927,233; 4,283,448; 4,390,384; 4,876,041; and 4,990,296.

A method used relatively widely to form welds joining two sheets of thermoplastic resin when access is limited to one side involves hand or mechanized hot gas welding techniques which are commonly known as "air welding". Such techniques, which are well known and documented, involve the use of a heated air or inert gas stream which functions to melt the edge portions of the two thermoplastic sheets and a compatible welding filler rod. Pressure is applied to the resultant molten or "gelled" area by the appropriately designed gun tip of the apparatus used in air welding. Common practice in the art is to "cap strip" the weld that is formed with a narrow (for example, ⅜" to 1" wide) strip of polymer sheet to help reinforce the weld.

Air welding suffers from several deficiencies. Being a hand operation, the quality of the weld is determined principally by the skill of the operator. The welding process is tiring physically and intense concentration is essential to obtain quality results. Typically, the welding speed is only a few inches per minute so many hours or days of welding are required on a typical vessel. It is difficult to ensure that during such long hours of welding consistent quality is maintained. Any flaw in the resultant welds can lead to failure of the liner, attack of the base metal and the potential for a chemical spill.

Tensile and elongation results which are achievable by the use of air welding are lower than those achievable with fusion welding techniques. Typical weld efficiencies are only 35% of virgin elongation and 70% of tensile.

The step created by the cap strip can trap contaminants. This is a problem in situations involving pharmaceutical applications and other high purity applications. In addition, since the cap strip is a protrusion on the otherwise flat surface, it can be snagged or caught and thus cause damage.

Over the years, there have been developed techniques for achieving highly reliable butt-fusion welded joints with weld efficiencies equal to or nearly equal to that of the parent material. This has been achieved by accurate control and uniformity of temperature and pressure. Such results have been limited, however, to applications where there is access to both sides of the polymeric sheet to be welded. When a sheet is bonded to a structural steel shell, this is not possible. Accordingly, the present state of the art is such that it is virtually impossible to economically ensure the application of uniform pressure along the length of the weld due to inherent irregularities in the underlying metallic surface. In the absence of the application of uniform pressure, there is a relatively high risk that the resulting weld will not be defect-free.

The present invention relates to improved and relatively economical means for welding two sheets of thermoplastic material, including sheets of a fluoropolymer material, by a technique which involves the use of heat and the application of uniform pressure along the entire length of the weld. Since the present invention only requires access to one side of the sheets to be welded, it is especially well suited for use in welding liners for process vessels.

SUMMARY OF THE INVENTION

In accordance with this invention, there is provided in a method in which a sheet of thermoplastic material (such as a fluoropolymer material), is welded to another sheet of thermoplastic material and in which a heating element directly overlies a seam formed by the edge portions of each of the sheets being in contact with each other, and wherein pressure is applied to the heating element to force it against the seam, and wherein heat is applied to the seam by the heating element to soften the materials comprising the sheets, the improvement comprising applying substantially uniform pressure in the form of atmospheric pressure to the heating element to force it against said seam.

In preferred form, the method aspects of the present invention comprise the steps of:

(A) locating a heating element substantially directly over a seam formed by the edge portion of each of the sheets being in contact with each other;

(B) utilizing atmospheric pressure to force the heating element against said seam as the heating element is heated and heat is transferred from the heating element to the material comprising said seam to effect softening thereof; and (C) thereafter terminating heating of the heating element and allowing the softened material of the seam to solidify to form a weld. In the preferred embodiment of the present invention, the atmospheric pressure is generated by the use of a vacuum bag (that is, the heating element and the seam formed by the edge portions to be welded together are encapsulated in an air-containing, air-impermeable collapsible enclosure) from which air is withdrawn by creating a negative pressure (vacuum) with respect to atmospheric pressure outside the bag.

Another aspect of the present invention is the provision of an article which includes a weld that joins the edge portion of one sheet of thermoplastic material such as a fluoropolymer material to the edge portion of a second sheet of the material, said weld comprising material from each of the edge portions of the sheets and having a weld efficiency of at least 50% of virgin elongation and at least 80% of tensile strength. In preferred form, the weld has an undoctored finish which does not extend beyond about 0.2 cm of the top surfaces of said sheets.

Still another aspect of the present invention involves the provision of an apparatus for the welding together abutting edges of sheets of a thermoplastic material, such as a fluoropolymer material, comprising:

(A) means for heating including an electrically resistive element located substantially directly over said edges to be welded together;

(B) means forming an air impermeable collapsible enclosure for the heating element and the sheet edges to be welded and for holding air, said enclosure having an outer surface;

(C) means for evacuating air from within the enclosure so that, as the air is so evacuated, there is applied to the outer surface of the enclosure atmospheric pressure which compresses the heating element against the sheet edges; and (D) means operable, while the heating element is compressed against the sheet edges, for activating the heating element to melt the material of the sheet edges. In preferred form, the apparatus further comprises means for thermally insulating the means forming the enclosure from the heat produced by the heating element and also vacuum regulation means for controlling the air pressure within the vacuum bag. Further, the enclosure comprises a vacuum bag sealed to the sheets to be welded together.

There are numerous advantages which are provided by the present invention. It should be appreciated that the present invention involves utilizing the weight of the surrounding air to apply in consistent fashion uniform pressure to the surface of the weld. In addition, the force of the air is uniform in all directions so welds in any orientation can be made. The pressure applied by the weight of air to the molten polymer is exactly the same as that applied to the non-molten area. This inherently results in a smooth weld that is free of steps and stress risers. High quality welds can be achieved on complex shapes without the need for complex, expensive tooling. Very long welds can be made with only minimal tooling costs.

Conventional air welding can only be done at a rate of 2" to 12" per minute and at least two passes are required to complete a weld. Often, laborious hand finishing is required to clean up between passes. In contrast, the present invention can be utilized in a manner such that the entire length of the weld is formed at the same time and under conditions which do not depend on the skill of a human operator and which do not require the use of a secondary filler rod (although such rod can be used).

Accordingly, the present invention can be used to produce, in a relatively short period of time, a uniform, defect-free and step-free weld, in almost any geometry, that will not trap contaminates. Consistently high quality welds are capable of being produced in an economic way.

BRIEF DESCRIPTION OF THE DRAWINGS

FIG. 1 is a perspective view of a wall portion of a process vessel on which sheets comprising thermoplastic polymer have been secured thereto and on which a welding means formed according to the instant invention is attached.

FIG. 2 is a front cutaway view of a wall portion and a welding means of similar form to FIG. 1.

DETAILED DESCRIPTION OF THE PREFERRED EMBODIMENT

Figure 3:
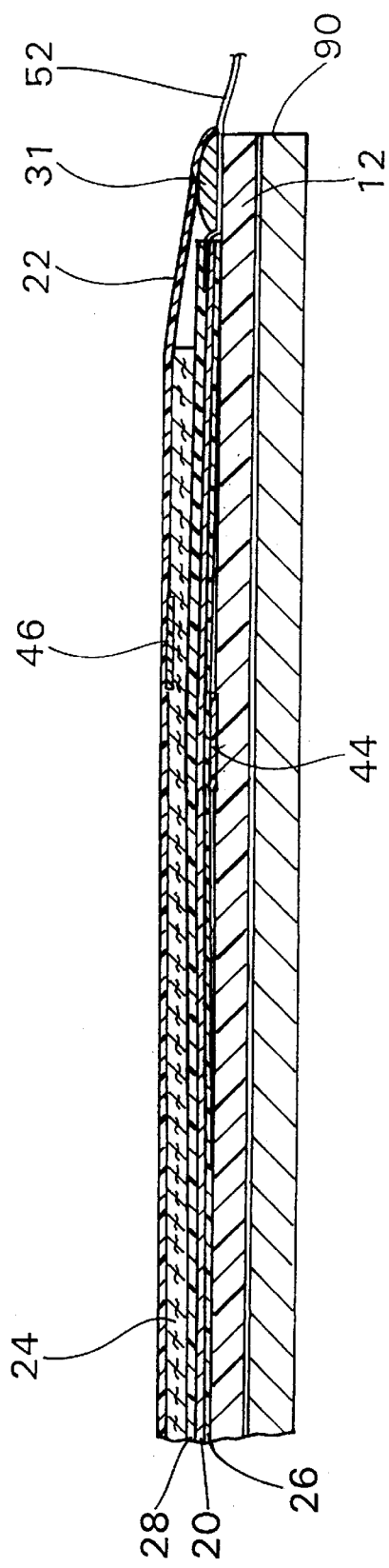
FIG. 3 is a longitudinal cross-sectional view of the wall portion and welding means taken along line 3—3 of FIG. 2.

Techniques for bonding or joining together of thermoplastic polymers, in sheet form, are known in the art. The most common bonding processes usually involve the application of heat to edge portions of the sheets. For bonding sheets of fluorocarbon polymer, heating is accompanied by the application of pressure. The edge portions are softened until they flow together under the application of pressure. Upon cooling, the materials solidify and the sheets are fused together. In the description which follows, this process is referred to as fusion welding. Equipment for carrying out this process is sometimes referred to as a fusion welder.

Using known welding techniques, it is extremely difficult and time consuming to achieve continuous, defect-free joints between fluorocarbon polymer sheets, including sheets used to line the walls of process vessels. An important reason why known prior art techniques are unsatisfactory is that, for some applications, it is virtually impossible to apply pressure uniformly to the edge portions to be welded. The application of uniform pressure is particularly difficult in forming sheets which are first bonded to a process vessel. The bonded or back surfaces of the sheets are no longer accessible to the workers installing the sheets; only the inward facing or front surfaces are accessible. Since the work must be carried out within a confined space, known prior art techniques are physically time consuming and require intense concentration to obtain a defect-free barrier at the seam. Accordingly, a means of producing a continuous non-porous weld which preserves the corrosion resistant and non-reactive properties of the polymer is highly desirable.

Although the apparatus and methods disclosed herein have applicability for joining together a large number of thermoplastic polymers, it is believed that the present invention will be used most widely in joining sheets of fluorocarbon polymer, including for example, sheets comprising the inner liner of a process vessel. As is well known, fluorocarbon polymers are a class of paraffinic polymers which have some or all of the hydrogen replaced by fluorine. Examples of fluorocarbon resins are polytetrafluoroethylene (PTFE), fluorinated ethylene propylene copolymer (FEP), perfluoroalkoxy (PFA) resin, polychlortrifluoroethylene (PCTFE), ethylenetrichlortrifluoroethylene copolymer (ECTFE), ethylenetetrafluoroethylene copolymer (ETFE), poly(vinylidene fluoride) (PVDF), poly(vinyl fluoride) (PVF), and mixtures of one or more of these. While it is contemplated that all of the above fluorocarbon polymers, including homopolymers, copolymers, block and graft copolymers of any of the above, may be used, it is believed that PTFE will be most widely used.

When lining a process vessel, a plurality of sheets comprising thermoplastic (and in particular fluoropolymer) materials must first be bonded to the interior walls of the vessel. The fluoropolymer sheets provide an inert and corrosion resistant barrier while the metallic shell of the vessel provides structural support. Individual sheets of fluoropolymer material may be customized or cut to the exact size and shape required to cover the entire interior surface of the vessel.

A portion of an interior wall 90 of a process vessel or storage tank is shown in FIG. 1. First and second fluoropolymer sheets 12, 14, respectively, are positioned proximate each other so that the edge portions 13, 15 are in abutting relationship.

The sheets 12, 14 are first bonded to the metallic shell 90 by a known adhesive means having the capability of creating a permanent bond between the liner sheets and the vessel. Examples of effective adhesive means are epoxies or elastomeric adhesives. The sheet material may have a glass or synthetic fabric laminated to the bonding face to improve the mechanical lock of the fluoropolymer material to the adhesive. The second sheet 14 and the remaining sheets required to cover the entire interior of the vessel are applied in a similar fashion.

Referring to the cut-away view of FIG. 2, the edge portions 13, 15 are brought in close proximity to each other. Preferably, as shown in the illustrated embodiments, the edge portion 15 is abutted directly against edge portion 13 forming an edge-to-edge interface.

If it is not possible to abut edge portions (e.g., because the configuration of the vessel prevents it), fluoropolymer filler rods may be used to fill in the gap between the edge portions. Generally, the filler rods are made of the same material as the sheets 12, 14. However, when the sheets are made of PTFE, the filler rods are preferably PFA (perfluoroalkoxy resin).

Figure 4:
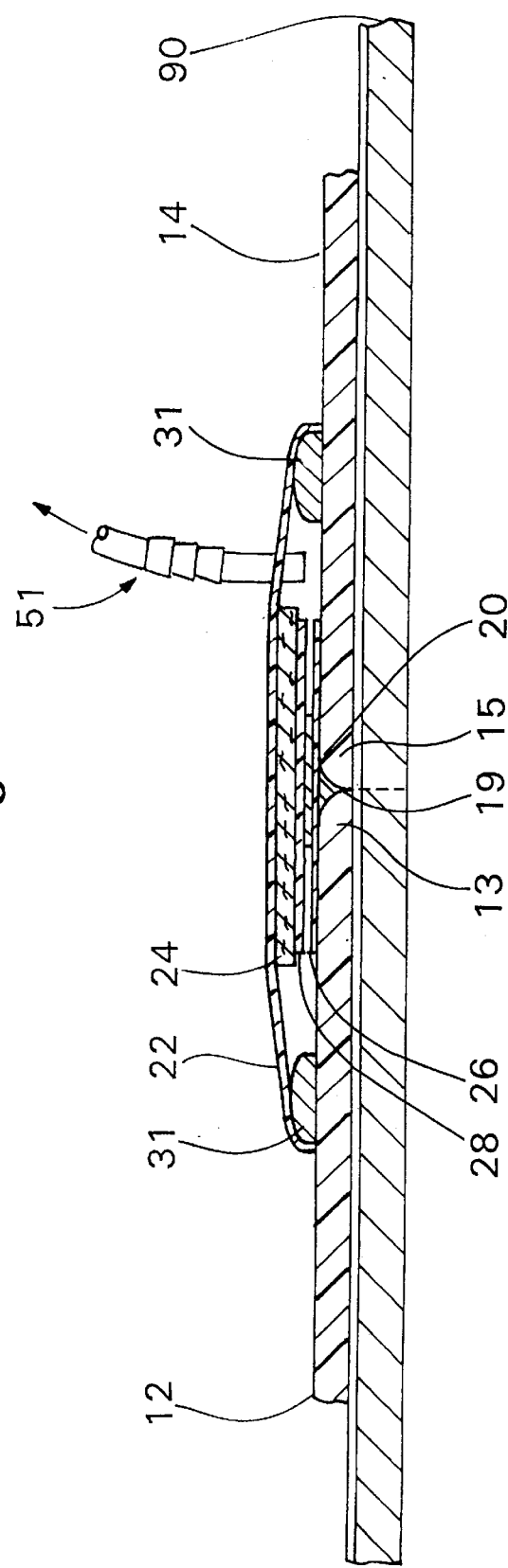
FIG. 4 is a cross-sectional view of the wall portion and welding means taken along line 4—4 of FIG. 2.

As illustrated in FIG. 4, in some applications, it may be desirable to bevel the edge portions 13, 15 of the sheets. Typically, a filler rod is used when the edge portions 13, 15 are beveled. Since the force applied by the welder 10 is substantially perpendicular to the plane of the sheets 12, 14, a more direct pressure is brought to bear against the edge-to-edge interface when the filler rod is forced into the space formed by the beveled edge portions thereby improving the quality of the resultant weld. The decision to bevel the edges usually depends on the ability of the sheet material to flow when heated. If the material does not flow readily, it is usually desirable to bevel the edges.

A welding means, as will be more fully described hereinafter, is generally indicated at 10. The welding means 10 is positioned over a seam 19 formed by abutting the edge portion 15 of second sheet 14 against the edge portion 13 of first sheet 14.

The welding means 10 comprises a fusion welder as explained more fully hereafter. The fusion welder includes means for applying heat and means for creating a vacuum proximate the region to be welded.

The heat applying means comprises an electrically resistive heating element. In the illustrated embodiment, the resistive heating element comprises a flexible heating ribbon 20. The resistive heating ribbon 20 is made of metal which has a low thermal coefficient of expansion; therefore, when the heating ribbon 20 is in place, it does not move or buckle when it heats up. In the preferred embodiment, the heating ribbon 20 is a metallic alloy made from approximately 64% iron and 36% nickel.

The width and thickness of the ribbon 20 must provide a sufficient watt density to melt the edge portions and may be customized for a particular application. As shown in FIGS. 2 and 4, it must be sufficiently wide to cover the "seam" or interface formed by the adjoining edge portions 13, 15 of each sheet. For the welding of sheets in a typical process vessel, the resistive heating ribbon 20 is approximately 1.905 cm and 0.0127 cm thick. For the preferred metal and dimensions, the heating ribbon 20 has a resistance of approximately 1.0 Ω per linear meter.

For relatively short welds (less than 1.25 meters), it is desirable to use a fiberglass insulated nickel-chromium heating tape as manufactured by BriskHeat Corporation. The nickel-chromium heating tape has a higher resistance per linear dimension allowing the welding operator to more accurately control the current flow to the heating tape thereby controlling the temperature of the heating tape.

In the preferred method, the fusion welder, and more particularly the resistive ribbon 20, covers the entire length of the seam. However, shorter fusion welders may be employed, in which case a relatively long seam must be welded in multiple steps, wherein each step begins by overlapping the previously welded area by approximately 1.27 cm and positioning the remaining portion of the fusion welder over an unwelded portion of the seam. Overlapping a portion of the previous weld reduces the chance of a defect at the weld junction.

The means for establishing a vacuum over the seam preferably comprises an air-impermeable membrane 22. The membrane 22 is made from a substantially non-porous flexible and collapsible material. In the preferred embodiment, a plastic material, preferably nylon film having a thickness of about 0.005 cm, as manufactured by I.P.P. of Carson, Calif. under the trademark STRETCHLON, is used. As shown in FIGS. 2, 3 and 4, the membrane 22 forms an enclosure which completely encompasses the resistive ribbon 20 and the edge portions 13, 15.

An adhesive means 31 is used to releasably attach the membrane 22 to the sheets 12, 14. The adhesive means 31 provides a hermetic seal between the four sides of the membrane and the sheets, thereby forming what is commonly referred to in the art as a vacuum bag. The adhesive means 31 should be of the type which is easily applied, readily bonds to the membrane and the fluoropolymer material, and is easily removed. One suitable adhesive means 31 is "High Tack Vacuum Bag Sealing Tape", as manufactured by Airtech International, Inc. under product number GS-213.

Alternatively, shim stock consisting of flexible stainless steel foil may be used instead of the nylon film to form the air impermeable membrane 22. In this case, closed cell self stick silicone sponge stripping is used as the adhesive means 31 to releasably attach the foil to the sheets 12, 14. The foil is placed over the heating ribbon and the silicone stripping is applied to the exterior of the foil and the sheets.

A breather/insulator pad 24, preferably comprised of a woven fiberglass insulation, may be placed between the membrane 22 and the resistive ribbon 20. The breather pad 24 must be porous to provide a pathway for the escaping air, otherwise it may be comprised of any fabric that can thermally protect the membrane 22, from heat generated by the heating ribbon. Further, the pad 24 also prevents heat loss from the resistive ribbon 20. In this manner, less energy is needed to fuse the sheets together.

Non-stick strips 26, 28 may be interposed between the resistive ribbon 20 and the edge portions 13, 15, and between the breather insulator pad 24 and the resistive ribbon 20, respectively. The non-stick strips 26, 28 are at least as wide as the resistive ribbon 20 and preferably have a thickness of about 0.013 cm. In preferred embodiment, the non-stick strips are made of polyimide as sold under the trademark Kapton®, manufactured by the E.I. du Pont de Nemours, Inc. At high temperatures, the resistive ribbon 20 has a tendency to stick to the edge portions 13, 15 of the fluoropolymer sheets and to the breather pad 24. The non-stick strips 26, 28 prevent the resistive ribbon 20 from sticking to these surfaces. In addition, non-stick strip 26 has a relatively smooth surface which contributes to the smooth finish on the resulting undoctored weld.

It is usually advantageous for the non-stick strips 26, 28 to be an electrical insulator. Since the non-stick strips 26, 28 come in direct contact with the resistive heating ribbon 20, they electrically isolate the heating ribbon 20 from other metals (e.g., the breather pad 24 may have some metal strands to provide support; and the tank wall 90 may be exposed at certain points) preventing an electrical short circuit.

Figure 5:
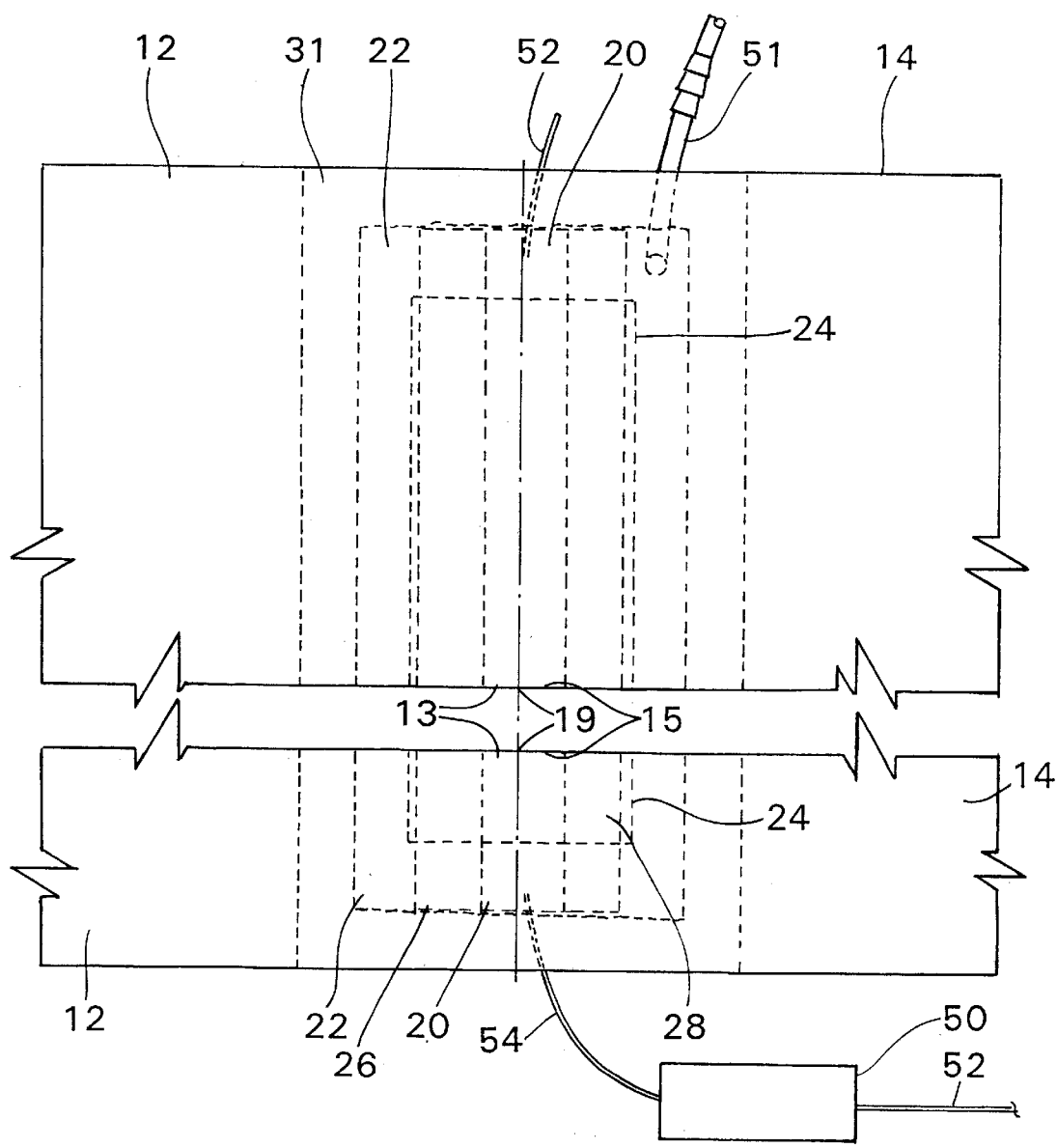
FIG. 5 is a plan view of a wall section depicting the entire run of a welding means along the seam, in accordance with the instant invention.

An electric current generating means 50 is attached via wires 52, 54 to the ends of the resistive ribbon 20, as shown schematically in FIG. 5. When the current is applied to the ribbon, the temperature of the ribbon begins to rise. The temperature of the ribbon is directly proportional to the amount of current flowing through the ribbon, and can be accurately regulated by a microprocessor controller.

Means for drawing and regulating a vacuum comprises a vacuum connector 51 which communicates with the interior of membrane 22, as shown in FIGS. 4 and 5, and a heavy-wall tubing (not shown). A vacuum connector 51 which may be used with a plastic vacuum bag is Vac Valve 409 SS HTR, manufactured by Airtech International, Inc. of Carson, Calif.

The vacuum means serves the purpose of evacuating the air from the interior of the membrane 22, establishing a negative pressure with respect to atmospheric pressure. As the air pressure within the vacuum bag is evacuated, the ambient atmospheric pressure is applied to the outer surface of the membrane 22 thereby causing the membrane 22 to collapse and applying a substantially uniform force against the resistive ribbon 20. The breather fabric 24 allows free passage of the air from within the membrane 22 and ensures the elimination of all bubbles within the system. (Air bubbles can balance the atmosphere pressure thereby preventing a uniform pressure along the entire length of the seam.) The force generated by the atmospheric pressure against the membrane 22 is in a direction substantially normal to the top surface of the resistive ribbon 20 insuring that the ribbon 20 remains uniformly and firmly pressed against the seam 19.

A description of the welding process follows. The vessel or object to which the thermoplastic (in particular, fluoropolymer) sheets will be attached is measured. A sheet of fluoropolymer material is selected to be used as a "standard" sheet. Therefore, many of the seams will have the same length. An advantage of using "standard" size fluoropolymer sheets is that one air-impermeable membrane and one resistive ribbon can be used and re-used to weld a majority of the seams of abutting fluoropolymer sheets.

The sheets are preferably selected and arranged in such a manner as to minimize the number of seams. Since the "standard" sheet may be four feet by eleven feet in dimension, it will not be unusual to weld an eleven-foot seam.

A sketch of how the sheets will be fitted to the interior of the vessel may be drawn. In addition, any irregularities (e.g., nozzles) on the wall portions of the vessel, are taken into account. The standard sheet may be cut to accommodate such variations at a remote location.

The sheets are transported to the site of the process vessel. The interior of the vessel is cleaned and prepared for application of the adhesive means. The adhesive may be applied either to the vessel or to the bonding surface of the fluoropolymer sheets.

After the fluoropolymer sheets have been secured to the walls of the vessel, the edge portions 13, 15 should be cleaned. If needed, a filler rod may be added at this time. The elements comprising the fusion welder 10 are placed over the seam in the following order: The first non-stick strip 26; the electrically resistive heating ribbon 20; the second non-stick strip 28, the breather fabric 24 and the membrane 22. A heat-resistant tape 44, 46 may be used, as needed, to secure the elements of the welder against the sheets 12, 14. The preferred tape is Kapton® having a self-sticking adhesive side such as AirKap 1 manufactured by Airtech International. The non-stick strip 26 and the resistive ribbon 20 are at least as long as the length of the desired weld, and are preferably as long as an entire seam. The tape strip 44 may be applied at intervals as needed to secure the strip 28 and the resistive ribbon 20 against the fluoropolymer sheets 12, 14.

The second non-stick strip 28 and the breather/insulator pad 24 are placed over the resistive ribbon 20. A second tape strip 46 may be used to secure the non-stick strip 26 and pad 24. Tape 46 may be the same material as used for tape 44.

The illustrative embodiment utilizes the breather/insulator pad 24 and the non-stick insulating strips 26, 28 to sandwich the resistive heating ribbon 20. It is understood by one skilled in the art that there may be applications in which the breather/insulator pad 24 and/or one or more of the non-stick strips 26, 28 may be omitted.

It should be noted that the resistive ribbon 20 with non-stick strips 26, 28 and/or pad 24 may be pre-formed and rolled-up as one unit. It may even be desirable to cut the elements to a desired length before they are rolled up. The roll is easily transported to the installation site. This will decrease the time needed to attach the component parts of the welder 10 over the seam 19.

The periphery of the air-impermeable membrane 22 is hermetically sealed to the fluoropolymer sheets. The sealed membrane 22 forms the vacuum bag which encloses the heating ribbon 20 and the edges 13, 15 to be welded together. Air is also trapped inside of the vacuum bag.

The current generating means 50 is electrically connected to the ends of the resistive ribbon 20. In the preferred embodiment, wire leads 52, 54 are attached to each end of the resistive ribbon 20, and are fed under the air-impermeable membrane 22. Alternatively, the wire leads 52, 54 may go through the bag. Regardless of how the leads are positioned, it should be noted that the air-impermeable membrane 22 must be sealed against the leads 21 to ensure that the vacuum bag remains air-impermeable.

As shown in FIG. 5, the vacuum means further comprises a vacuum connector 51 which communicates with the interior of the air-impermeable flexible membrane 22. The vacuum means is activatable to thereby remove the air from inside the sealed flexible membrane 22. Atmospheric pressure compresses the flexible membrane 22 against the resistive ribbon 20, which in turn is compressed against the surfaces contiguous to edge portions 13, 15 of the fluoropolymer sheets.

The evacuated vacuum bag provides a simple and effective low vacuum-pressure means for the application of a uniform force along the entire run of the resistive ribbon 20. The force created by ambient atmospheric pressure against the membrane 22 ensures that the resistive ribbon 20 remains flat and uniformly pressed against the seam 19 thereby increasing the uniformity of the pressure and temperature at all points along the seam in a simple, but highly effective manner.

After the vacuum is established, the current producing means is activated thereby heating the resistive ribbon 20. The current is applied to the resistive ribbon 20 until the edge portions 13, 15 become molten. The vacuum means remains activated until the molten fluoropolymer material cools and solidifies. After the fluoropolymer material has solidified, the releasable adhesive means attaching the flexible membrane 22 is removed. The breather/insulator pad 24 and the resistive ribbon sandwich are also removed. In the manner described, the edge portions 13, 15 are joined, thereby forming a contiguous, non-porous, uniform joint having substantially the characteristics of the virgin material.

The resulting weld has a weld efficiency of at least 50% of virgin elongation and at least 80% of tensile strength of the virgin material as measured using the ASTM 638 standard.

Further, the undoctored weld surface does not extend beyond about 0.2 cm from the plane defined by the top surfaces of said sheets resulting in a relatively smooth weld that reduces the accumulation of the contaminants. Not only is the undoctored finish of a weld (i.e., the appearance of the weld without any sanding, shaping, machining, buffing, etc.) made by the instant welder better than the undoctored finish of welds made by other techniques, it contains no flaws. (Flaws are defined as defects in the weld that will not withstand an imposed 20,000 volt DC "spark test" in accordance with the standards set by the Society of Plastics Industry.)

Even though particular embodiments of the present invention have been illustrated and described herein, this is not intended to limit the invention. It is therefore to be understood that modification and variation of the embodiments described above may be made without departing from the spirit or scope of the invention.

We claim:

1. A method for welding together abutting edges of adjacent sheets of thermoplastic material comprising:

first positioning an electrically resistive heating element formed of flexible strip material upon the adjacent sheets so as to substantially cover said edges to be welded together;

next forming an air impermeable collapsible enclosure over the heating element and the sheet edges to be welded together and for holding air, said enclosure having an outer surface and an inner surface;

evacuating the air from within the enclosure so that as the air is so evacuated, there is applied to the outer surface of the enclosure atmospheric pressure which compresses the inner surface against the heating element and the heating element against the sheet edges;

activating the heating element while the heating element is compressed against the sheet edges to melt the thermoplastic material of the sheet edges; and isolating the heating element from the sheet edges while the thermoplastic material is softened by interposing a protective layer of a non-stick strip material between the heating element and the sheet edges, whereby incorporation of the heating element into the weld is avoided.

2. The method of claim 1 wherein the thermoplastic material is a fluoropolymer.

3. The method according to claim 2 wherein the fluoropolymer is polytetrafluoroethylene.

4. The method according to claim 1 including the step of positioning a layer of insulating, porous material between the heating element from the enclosure.

5. A method according to claim 1, wherein the non-stick strip material is a polyimide.

6. An apparatus for the welding together abutting edges of sheets of thermoplastic material comprising:

means for heating including an electrically resistive flexible heater ribbon located substantially directly over both of said edges to be welded together;

means forming an air impermeable collapsible enclosure for the heating element and the sheet edges to be welded and for holding air, said enclosure having an outer surface;

means for evacuating air from within the enclosure so that as the air is so evacuated, there is applied to the outer surface of the enclosure atmospheric pressure which compresses the heating element against the sheet edges;

means operable, while the heating element is compressed against the sheet edges, for activating the heating element to melt the thermoplastic material of the sheet edges;

a porous, thermally insulating barrier interposed between the electrically resistive ribbon and the enclosure; and a non-stick material in strip form interposed between the electrically resistive ribbon and the edges to be welded together, said strip being dimensioned to provide a layer separating and preventing incorporation of the heating element into the weld.

7. The apparatus of claim 6, further comprising a porous insulating shield between the electrically resistive ribbon and the means forming the enclosure for thermally insulating the means forming the enclosure from the heat produced by the electrically resistive ribbon.

8. The apparatus of claim 6 in which the enclosure comprises a vacuum bag releasably sealed to the sheets to be welded together.

9. The apparatus of claim 8 further comprising means for thermally insulating the vacuum bag from the heat produced by the electrically resistive ribbon.

10. The apparatus of claim 9 wherein the thermal insulating means is a porous material interposed between the vacuum bag and the electrically resistive ribbon.

11. The apparatus of claim 10 further comprising vacuum regulation means to control the air pressure within the vacuum bag to a pressure no greater than atmospheric pressure.

12. The apparatus of claim 11 wherein the thermoplastic material is a fluoropolymer.

13. The apparatus of claim 6 wherein the heating element is a flexible, electrically-resistive ribbon.

14. The apparatus of claim 6 wherein the heating means further comprises an electric current generator connected to the electrically resistive ribbon and means to control the current flowing through the electrically resistive ribbon.

15. The apparatus of claim 7 further comprising non-stick strip material interposed between the heating element and the thermal insulating means.

16. The apparatus of claim 13 wherein the heating element is comprised of a metal.

17. The apparatus of claim 6 wherein the abutted edges form an elongated seam and said heating element is located over substantially the entire elongated seam.

18. The apparatus of claim 6 wherein the welding apparatus is applied to only one side of the thermoplastic sheets.

* * * * *